(12) United States Patent
Yoshikane et al.

(10) Patent No.: US 7,903,969 B2
(45) Date of Patent: Mar. 8, 2011

(54) LINK CONNECTIVITY VERIFICATION METHOD

(75) Inventors: Noboru Yoshikane, Saitama (JP);
Takehiro Tsuritani, Saitama (JP);
Tomohiro Otani, Saitama (JP)

(73) Assignee: KDDI Corporation, Tokyo (JP)

( * ) Notice: Subject to any disclaimer, the term of this patent is extended or adjusted under 35 U.S.C. 154(b) by 729 days.

(21) Appl. No.: 11/822,908

(22) Filed: Jul. 11, 2007

(65) Prior Publication Data
US 2008/0013949 A1 Jan. 17, 2008

(30) Foreign Application Priority Data

Jul. 14, 2006 (JP) .................................. 2006-194177

(51) Int. Cl.
*H04B 17/00* (2006.01)
(52) U.S. Cl. .................. 398/30; 398/31; 398/32
(58) Field of Classification Search ............. 398/30, 398/50, 16; 3/30, 50
See application file for complete search history.

(56) References Cited

U.S. PATENT DOCUMENTS

| | | | | |
|---|---|---|---|---|
| 5,043,976 A | * | 8/1991 | Abiven et al. ............. | 398/136 |
| 5,436,746 A | * | 7/1995 | Hirst ......................... | 398/37 |
| 5,515,361 A | * | 5/1996 | Li et al. ..................... | 370/222 |
| 2003/0030893 A1 | * | 2/2003 | Cornelius et al. ......... | 359/341.4 |
| 2005/0083835 A1 | * | 4/2005 | Prairie et al. .............. | 370/224 |

OTHER PUBLICATIONS

J Lang et al, Link Management Protocol, IETF Draft Jul. 2000.*
J. Lang ed., et al.; "Link Management Protocol (LMP)"; Network Working Group Request for Comments: RFC 4204 Section 5; Oct. 2005; pp. 1-134.
A. Fredette, Ed., et al.; "Link Management Protocol (LMP) for Dense Wavelength Division Multiplexing (DWDM) Optical Line Systems"; Network Working Group Request for Comments: RFC 4209 Section 2; Oct. 2005; pp. 1-25.

* cited by examiner

*Primary Examiner* — Shi K Li
*Assistant Examiner* — Danny W Leung
(74) *Attorney, Agent, or Firm* — Westerman, Hattori, Daniels & Adrian, LLP

(57) ABSTRACT

A link connectivity verification message to recognize a physical link connection state is transmitted from the WDM to the PXC on a C-plane. The PXC transmits a link connectivity verification ACK message including information representing a physical link connection state, and the WDM transmits a cross-connect instruction message to cross-connect a transmission side and a reception side of a port (port 1) of the PXC. Probe light transmitted from the port (port a) of the WDM is turned back by a cross-connect of the port (port 1) of the PXC. The WDM receives the probe light to verify a link connectivity.

5 Claims, 2 Drawing Sheets

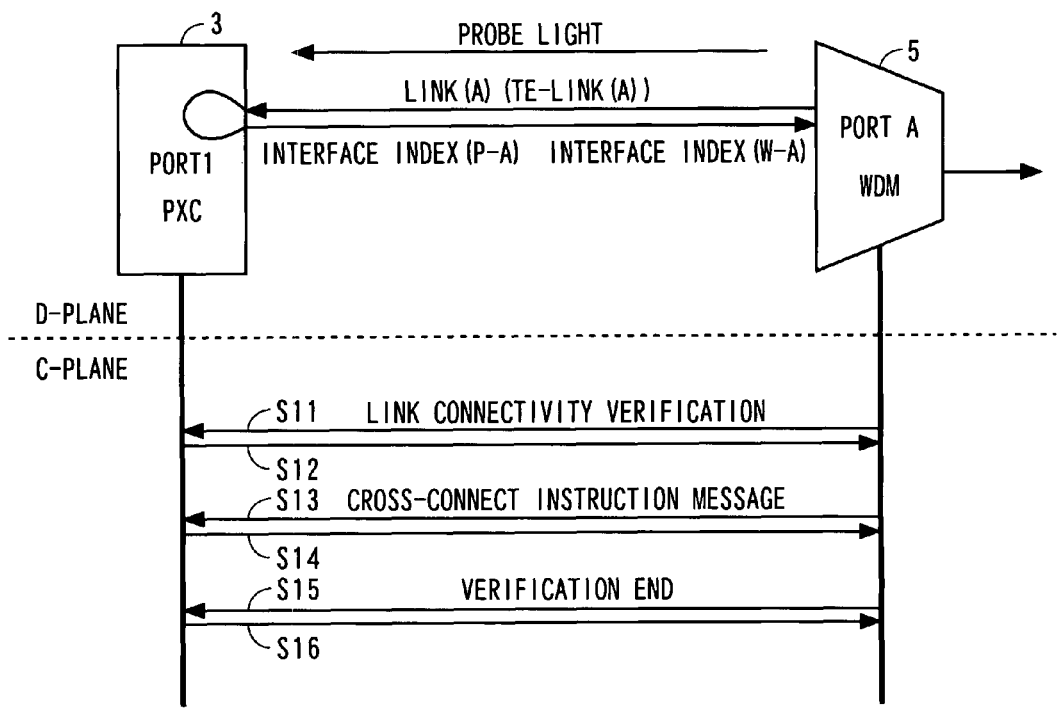
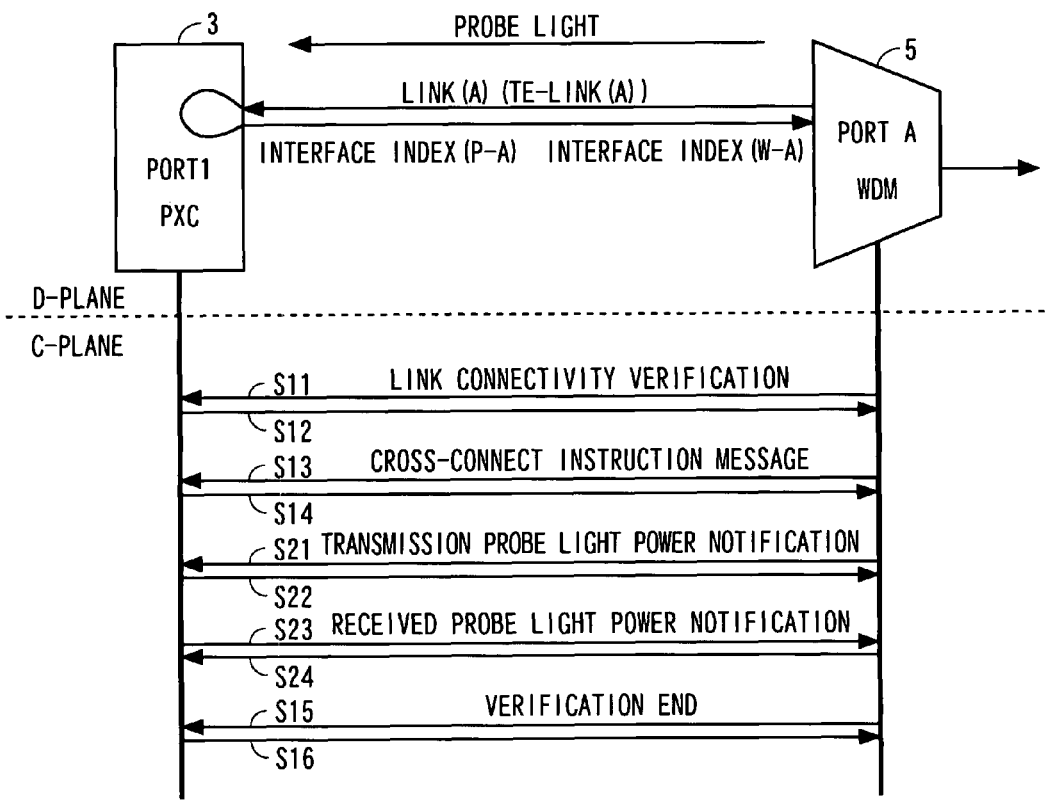

LINK CONNECTIVITY VERIFICATION METHOD

BACKGROUND OF THE INVENTION

1. Field of the Invention

The present invention relates to a link connectivity verification method and, in particular, to a link connectivity verification method which verifies connectivity of a physical link between a photonic cross-connect equipment and a transmission equipment which constitute a node of an optical network.

2. Description of the Related Art

A connectivity of a link in a GMPLS optical network including a photonic cross-connect equipment (PXC) can be verified by transmitting an optical signal from one-end side of a target link and receiving the transmitted signal on the other-end side.

FIG. 5 is a conceptual diagram showing a conventional link connectivity verification method. In this case, a simplest 2-node network configuration in an optical network is shown. Two nodes, i.e., nodes 1 and 2 are interposed between client connect equipment A and B. The node 1 (left side in FIG. 5) includes a photonic cross-connect equipment (PXC) 3 and a transmission equipment (to be referred to as a WDM hereinafter) 5 such as a WDM, and the node 2 (right side in FIG. 5) includes a PXC 4 and a WDM 6.

A link connectivity between the PXCs 3 and 4 is verified by externally connecting optical transceivers C and D to the PXCs 3 and 4, respectively and transmitting and receiving an optical signal between the PXCs 3 and 4. For example, an optical signal is transmitted from the optical transceiver C on the PXC 3 side, and the optical signal transmitted through a link is received by the optical transceiver D on the PXC 4 side to verify a link connectivity between the PXCs 3 and 4. This link connectivity verification method is described in IETF RFC4204 Section 5 and IETF RFC4209 Section 2.

However, in the conventional link connectivity verification method, an optical transceiver corresponding to a client signal format of a transmission equipment, for example, SDH (Synchronous Digital Hierarchy), GbE (Gigabit Ethernet (registered trade name)), 10 GbE, or the like is required to verify a link connectivity. When a link connection of an optical network including various client signals is to be verified, optical transceivers coping with various signal formats must be prepared. For this reason, a system having a link connectivity verifying function cannot be economically structured.

In an optical network constituted by PXCs and WDMs, i.e., a so-called Opaque type optical network, it cannot be verified whether a link fault between the PXC and the WDM is occurred or a link fault between the WDM and the WDM is occurred. Since the connectivity fault cannot be distinguished, a rapid and accurate countermeasure cannot be made.

SUMMARY OF THE INVENTION

It is an object of the present invention to solve above problems and to provide a link connectivity verification method which can verify connectivity of a physical link between a PXC and a WDM without using an externally connected optical transceiver.

In order to accomplish the object, a first aspect of the present invention is that a link connectivity verification method for an optical network including a node having a photonic cross-connect equipment and a transmission equipment, comprises the step of transmitting a link connectivity verification message on a control plane from the transmission equipment to the photonic cross-connect equipment to recognize a physical link connection state for one port of the transmission equipment;

the step of transmitting a link connectivity verification ACK message on the control plane from the photonic cross-connect equipment to the one port in response to the link connectivity verification message, wherein the link connectivity verification ACK message includes information representing a physical link connection state for the one port;

the step of transmitting a cross-connect instruction message on the control plane from the transmission equipment to cross-connect a transmission side and a reception side of a port of the photonic cross-connect equipment connected the one port on the basis of the link connectivity verification ACK message;

the step of causing the photonic cross-connect equipment to cross-connect the transmission side and the reception side of the port of the photonic cross-connect equipment in response to the cross-connect instruction message; and the step of transmitting probe light on a data plane from the one port of the transmission equipment to the photonic cross-connect equipment and to receive probe light obtained by turning back the probe light from a cross-connect of the photonic cross-connect equipment, wherein connectivity of a physical link connected to the one port between the photonic cross-connect equipment and the transmission equipment is verified by a light-receiving state of the probe light received by the transmission equipment.

A second aspect of the present invention is that a link connectivity verification method for an optical network including a node having a photonic cross-connect equipment and a transmission equipment, comprises the step of transmitting a link connectivity verification message on a control plane, wherein the link connectivity verification message includes an interface index of one port of the transmission equipment and a cross-connect instruction to cross-connect a port of the photonic cross-connect equipment connected to a port of the interface index from the transmission equipment to the photonic cross-connect equipment;

the step of causing the photonic cross-connect equipment to cross-connect a transmission side and a reception side of the photonic cross-connect equipment connected to a port of the interface index of the transmission equipment by a link in response to the cross-connect instruction included in the link connectivity verification message; and the step of transmitting probe light from the port of the interface index of the transmission equipment to the photonic cross-connect equipment and receiving probe light obtained by turning back the probe light from a cross-connect of the photonic cross-connect equipment, wherein connectivity of a physical link connected to the one port between the photonic cross-connect equipment and the transmission equipment is verified by a light-receiving state of the probe light received by the transmission equipment.

A third aspect of the present invention is that the link connectivity verification method, further comprises the step of monitoring and comparing a power of probe light transmitted and received by the transmission equipment, a power of probe light received by the photonic cross-connect equipment, and a power of probe light turned back and transmitted by the photonic cross-connect equipment, wherein a fault in a direction from the transmission equipment to the photonic cross-connect equipment or a fault in a direction from the photonic cross-connect equipment to the transmission equipment can be distinguished from each other.

A forth aspect of the present invention is that the link connectivity verification method, wherein, when the above steps are sequentially executed by using a plurality of links between the photonic cross-connect equipment and the transmission equipment as objects to be applied, connectivity of a plurality of links is verified. According to the first aspect of the present invention, connectivity of a physical link between the optical transmission equipment and the photonic cross-connect equipment can be verified. Since the link connectivity can be verified by using a client-side optical transceiver originally included in the optical transmission equipment, a special optical transceiver need not be externally connected to verify a link connectivity. Therefore, a system having a link connectivity verifying function can be economically structured.

According to the second aspect, a link connectivity can be rapidly verified with a small number of procedures.

According to the third aspect, when a link fault between the transmission equipment and the photonic cross-connect equipment is detected, it can be determined whether the fault is occurred in direction from the transmission equipment to the photonic cross-connect equipment or from the photonic cross-connect equipment to the transmission equipment. In this manner, a rapid and accurate countermeasure against the fault can be made.

According to the fourth aspect, link connectivity of a plurality of links between the photonic cross-connect equipment and the transmission equipment can be verified.

BRIEF DESCRIPTION OF THE DRAWINGS

FIG. 1 is a diagram showing a node configuration in an optical network and an operation in the first embodiment of the present invention.

FIG. 2 is a diagram showing a node configuration in an optical network and an operation in the second embodiment of the present invention.

DETAILED DESCRIPTION OF THE PREFERRED EMBODIMENTS

Figure 3:
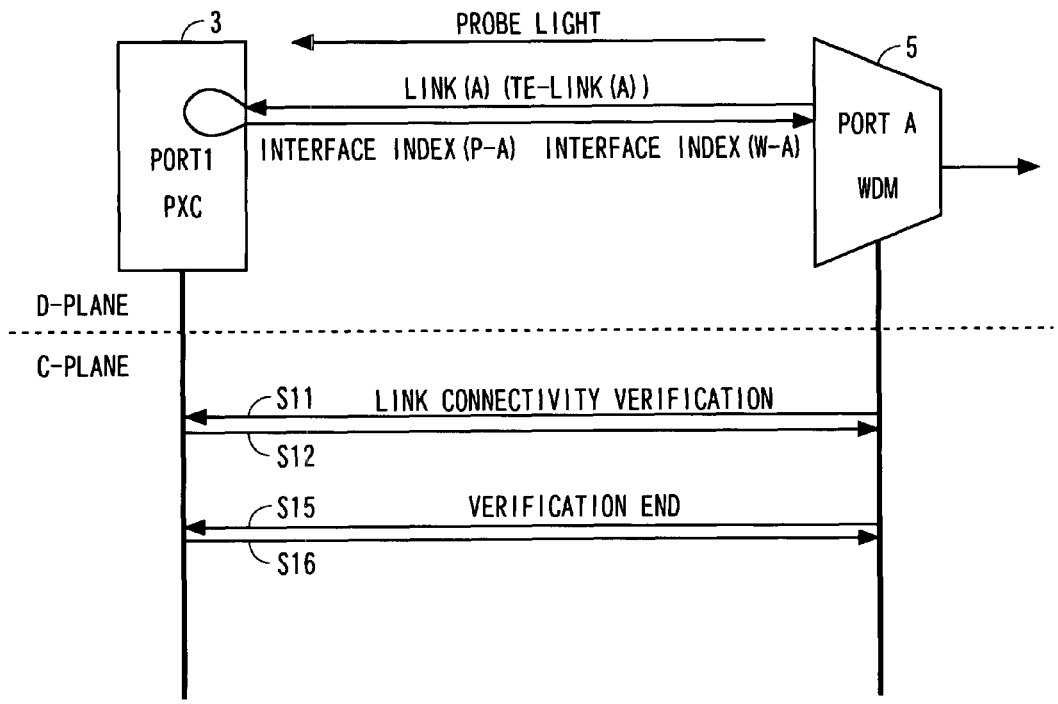
FIG. 3 is a diagram showing a node configuration of an optical network and an operation in the third embodiment of the present invention.

The embodiment of the present invention will be described below with reference to the accompanying drawings. FIG. 1 is a diagram showing one node configuration in an optical network and an operation in the first embodiment of the present invention. The node configuration has a PXC 3 and a WDM 5 as shown in FIG. 1. A port (port 1) of the PXC 3 and a port (port a) of the WDM 5 are connected to each other by one data link (Link (a)) on a data plane (D-plane), and a logical link (TE-link (a)) is associated with the data link (Link (a)).

The ports of the PXC and the WDM connected to the TE-link are expressed by interface indexes (Interface indexes). In this case, it is assumed that the port (port 1) of the PXC 3 connected to the TE-link (a) is expressed by Interface index (p-a) and that the port (port a) of the WDM 5 connected to the TE-link (a) is expressed by Interface index (w-a).

The lower part in FIG. 1 is a flow chart showing procedures on a control plane (C-plane) in the first embodiment of the present invention. The link connectivity between the PXC 3 and the WDM 5 is verified by transmitting and receiving various messages on the C-plane and transmitting and receiving probe light on the D-plane.

The link connectivity verifying operation can be performed by using a client-side optical transceiver originally included in the WDM without using an externally connected optical transceiver. The link connectivity verifying operation can be performed to all ports of the WDM before the network operates when the network is structured. Even in the operation of the network, the verifying operation can be properly or periodically performed to a port being out of service. The link connectivity verifying operation is executed at each node in the optical network to make it possible to verify a link connectivity between a PXC and a WDM of each node.

In FIG. 1, since the WDM 5 starts connectivity verification of the Link (a) connected to the port a (Interface index (w-a)), a link connectivity verification message is transmitted to the PXC 3 on the C-plane (S11). Information of Interface index (w-a) of the port a of the WDM 5 is included in the link connectivity verification message.

When the PXC 3 receives the link connectivity verification message, information of the interface index (w-a) included in the link connectivity verification message is found from TE-link information in a database. The TE-link in formation in the database includes information of a port (Interface index) of the WDM included in each TE-link. As a result, since it is retrieved that the TE-link (a) includes the Interface index (w-a), the PXC 3 recognizes that a port (port a) called the Interface index (w-a) of the WDM 5 is connected to a port (port 1) called an Interface index (p-a) of the PXC 3.

The PXC 3 transmits a link connectivity verification ACK (acknowledgement) message to the WDM 5 (S12). Information representing that a connection destination of the Interface index (w-a) is the Interface index (p-a) is included in the link connectivity verification ACK message.

When the WDM 5 receives the link connectivity verification ACK message from the PXC 3, the WDM 5 transmits a cross-connect instruction message to the PXC 3 on the C-plane (S13). The cross-connect instruction message is a message to cross-connect transmission/reception directions of the port (port 1) of the PXC 3.

When the PXC 3 receives the cross-connect instruction message from the WDM 5, the PXC 3 cross-connects the transmission/reception directions of the port (port 1) as indicated by a solid line in the PXC 3 in FIG. 1. Upon completion of the cross-connect, the PXC 3 returns the cross-connect instruction ACK message to the WDM 5 on the C-plane (S14). Upon completion of the cross-connect, in order to start a link connectivity verifying operation, a path using the port (port 1) of the PXC 3 and the port (port a) of the WDM 5 cannot be formed.

When the WDM 5 receives the cross-connect instruction ACK message, the WDM 5 transmits probe light from the transmission side of the port (port a) to the PXC 3 on the D-plane. The probe light transmitted from the WDM 5 is turned back from the reception side of the port (port 1) cross-connected in the PXC 3 to the transmission side and transmitted toward the WDM 5.

The WDM 5 receives probe light on the reception side of the port (port a). In this case, when a value of power of the probe light transmitted from the WDM 5 is compared with a value of power of the probe light turned back and received to make it possible to determine whether the probe light is attenuated higher than a preset threshold value in the transmission. On the basis of the result, it is possible to verify a link connectivity whether a fault occurs in a link between the WDM 5 and the PXC 3.

The link connectivity, as described above, can be determined by a power of probe light turned back and received. Probe light which carries data such as AIS may be transmitted from the WDM 5. The link connectivity can be determined by a receiving state of the probe light.

When the link connectivity verifying operation by probe light is completed, the WDM 5 transmits a link connectivity verification end message to the PXC 3 on the C-plane (S15).

When the PXC 3 receives the link connectivity verification end message, the cross-connect in the transmission/reception directions of the port (port 1) is released. The PXC 3 returns the link connectivity verification end ACK message to the WDM 5 to notify the WDM 5 that the PXC 3 receives the link connectivity verification end message (S16).

A second embodiment of the present invention will be described below. FIG. 2 is a diagram showing one node configuration in an optical network and an operation in the second embodiment of the present invention. The same reference numerals as in the first embodiment denote the same or equivalent procedures in the second embodiment.

The second embodiment is different from the first embodiment in the following point. Probe light powers are monitored by the PXC 3 and the WDM 5, respectively, and, on the basis of the values, it is possible to distinguish a fault occurring in a direction from the WDM 5 to the PXC 3 or a fault occurring in a direction from the PXC 3 to the WDM 5. The different point between the first embodiment and the second embodiment will be mainly described below.

The second embodiment is the same as the first embodiment in the following operations. That is, the WDM 5 receives a link connectivity verification message from the PXC 3 and transmits a cross-connect instruction message to the PXC 3 (S13). The PXC 3 receives the cross-connect instruction message to cross-connect transmission/reception directions of the port (port 1), and returns the cross-connect instruction ACK message to the WDM 5 (S14).

Thereafter, the WDM 5 transmitted a transmission probe light power notification message (S21) on the C-plane to notify a transmission probe light power transmitted to the PXC 3. When the PXC 3 receives the transmission probe light power notification message, the PXC 3 returns a transmission probe light power notification ACK message (S22).

When the WDM 5 receives the transmission probe light power notification ACK message, the WDM 5 transmits probe light on the D-plane from the transmission side of the port (port a) to the PXC 3. The probe light transmitted from the WDM 5 is turned back from the reception side of the port (port 1) cross-connected in the PXC 3 to the transmission side and transmitted to the WDM 5.

The WDM 5 receives the probe light on the reception side of the port (port a). At this time, the PXC 3 monitors a power of probe light transmitted from the WDM 5 and a power of probe light turned back and transmitted to the WDM 5 and notifies the WDM 5 of the monitored values by a received probe light power notification message on the C-plane (S23).

When the WDM 5 receives the received probe light power notification message, the WDM 5 returns the received probe light power notification ACK message to the PXC 3 (S24). The WDM 5 receives the probe light turned back and transmitted by the PXC 3, monitors a power of the received probe light, and stores the value.

In this manner, the WDM 5 can know the value of the optical power of the probe light transmitted by the WDM 5, the value of the optical power of the probe light received by the PXC 3, the value of the optical power of the probe light transmitted from the PXC 3, and the value of the optical power of the probe light received by the WDM 5.

In this case, the value of power of the probe light transmitted from the WDM 5 is compared with the value of power of the probe light turned back and received by the PXC 3 to make it possible to determine whether the probe light is attenuated higher than a preset threshold value in the transmission. On the basis of the determination result, it can be verified whether a fault occurs in a link between the WDM 5 and the PXC 3. More specifically, when the optical power received by the WDM 5 is attenuated higher than the preset threshold value, it can be determined that a fault occurs in the link.

The value of the optical power transmitted by the WDM 5 is compared with the value of the optical power received by the PXC 3, and the value of the optical power obtained when probe light is transmitted from the PXC 3 is compared with the value of the optical power received by the WDM 5. In this manner, a fault occurring in a direction from the WDM 5 to the PXC 3 or a fault occurring in a direction from the PXC 3 to the WDM 5 can be distinguished from each other.

Upon completion of the link connectivity verifying operation by probe light, transmission of a link connectivity verification end message from the WDM 5 (S15), releasing of a cross-connect by the PXC 3, and returning of a link connectivity verification end ACK message from the PXC 3 (S16) are performed as in the first embodiment.

A third embodiment of the present invention will be described below. FIG. 3 is a diagram showing one node configuration of an optical network and an operation in the third embodiment of the present invention. The same reference numerals as in the first embodiment denote the same or equivalent procedures in the third embodiment.

In the third embodiment, "an Interface index of a WDM and an instruction to cross-connect transmission/reception directions of a port of a PXC connected to the Interface index" is included in a message which is transmitted by the WDM for the first time to simplify the procedures so as to make it possible to rapidly perform a link connectivity verifying operation.

In FIG. 3, the WDM 5 transmits a link connectivity verification message to the PXC 3 on the C-plane to start connectivity verification of a Link (a) connected to a port a (Interface index (w-a)) (S11). At this time, "the Interface index (w-a) of the WDM 5 and an instruction to cross-connect transmission/reception direction of the port of the PXC connected to the Interface index (w-a)" is included in a link connectivity verification message.

When the PXC 3 receives the link connectivity verification message from the WDM 5, the PXC 3 finds information of the Interface index (w-a) included in the link connectivity verification message from the TE-link information in a database. The TE-link information in the database includes information of a port (Interface index) of a WDM included in each TE-link. As a result, since it is found that the Interface index (w-a) is included in the TE-link (a), the PXC 3 recognizes that a port (port a) called the Interface index (w-a) of the WDM 5 is connected to a port (port 1) called the Interface index (p-a) of the PXC 3. Therefore, the PXC 3 cross-connect the transmission/reception direction of the port (port 1) according to a cross-connect instruction.

Upon completion of the cross-connect, the PXC 3 returns a link connectivity verification ACK message to the WDM 5 on the C-plane (S12). When the WDM 5 receives the link connectivity verification ACK message, the WDM 5 transmits probe light from the transmission side of the port (port a) to the PXC 3 on the D-plane. The probe light transmitted from the WDM 5 is turned back from the reception side of the port (port 1) cross-connected in the PXC 3 to the transmission side and transmitted to the WDM 5.

The WDM 5 receives probe light on the reception side of the port (port a). In this case, a value of power of the probe light transmitted from the WDM 5 is compared with a value of power of the probe light turned back and received to make it possible to determine whether the probe light is attenuated higher than a preset threshold value in the transmission. On the basis of the result, it is possible to verify a link connectivity whether a fault occurs in the link between the WDM 5 and the PXC 3.

Upon completion of the link connectivity verifying operation by probe light, the WDM 5 transmits a link connectivity verification end message to the PXC 3 on the C-plane (S15).

When the PXC 3 receives the link connectivity verification end message, the cross-connect in the transmission/reception directions of the port (port 1) is released. The PXC 3 returns the link connectivity verification end ACK message to the WDM 5 to notify the WDM 5 that the link connectivity verification end message is received (S16).

In the third embodiment, as in the second embodiment, powers of probe light are monitored by the PXC 3 and the WDM 5, respectively. On the basis of the values, a fault occurring in a direction from the WDM 5 to the PXC 3 can be distinguished from a fault occurring in a direction from the PXC 3 to the WDM 5.

The connectivity verification of one link (Link (a)) between the PXC 3 and the WDM 5 is described. However, when the procedures and the operations are sequentially executed to a plurality of links, the connectivity of the plurality of links can be verified. When the connectivity of the plurality of links are verified, a link connectivity verification end process performed by a link connectivity verification end message and a link connectivity verification end ACK message may be performed each time the connectivity verifying operation of each link, or may be performed after the connectivity verifying operations of all the links to be verified are ended.

Figure 4:
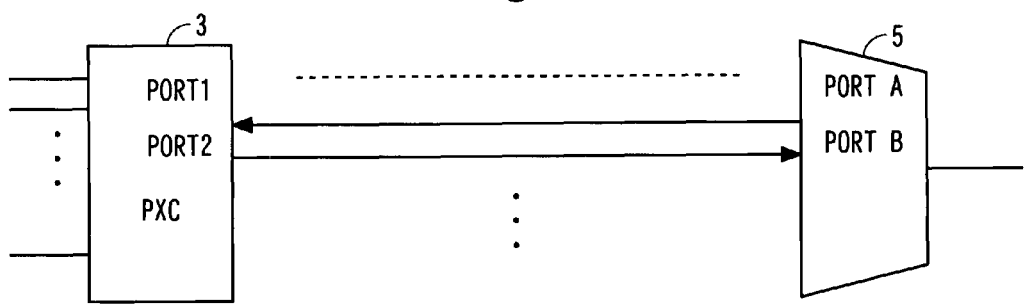
FIG. 4 is a diagram showing another example of a connection between a transmission equipment and a photonic cross-connect equipment.
Figure 5:
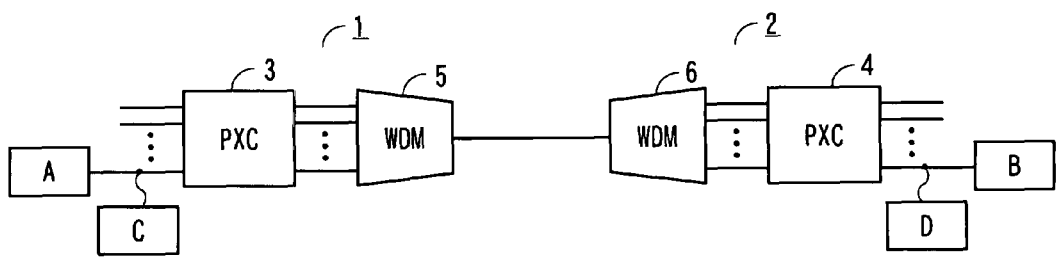
FIG. 5 is a conceptual diagram showing a conventional link connectivity verification method.

The WDM 5 may have a port which is not connected to the PXC 3 by a link. For example, as shown in FIG. 4, a port (port a: Interface index (w-a)) of the WDM 5 and a port (port 1: Interface index (p-a)) of the PXC 3 may not be physically connected to each other by a link. In this case, even though a link connectivity verification message including information of the Interface index (w-a) is transmitted from the WDM 5, the PXC 3 cannot find the information of the Interface index (w-a) from TE-link information in a database. In this case, the link connectivity verification NAK (negative acknowledgement) message instead of the link connectivity verification ACK message is transmitted from the PXC 3 to the WDM 5 to end the verifying operation of the link connectivity to the port without performing the subsequent procedures.

What is claimed is:

1. A link connectivity verification method for an optical network including a node having a photonic cross-connect equipment and a transmission equipment, comprising:

the step of transmitting a link connectivity verification message on a control plane from the transmission equipment to the photonic cross-connect equipment to recognize a physical link connection state for one port of the transmission equipment;

the step of transmitting a link connectivity verification ACK message on the control plane from the photonic cross-connect equipment to the one port in response to the link connectivity verification message, wherein the link connectivity verification ACK message includes information representing a physical link connection state for the one port;

the step of transmitting a cross-connect instruction message on the control plane from the transmission equipment to cross-connect a transmission side and a reception side of a port of the photonic cross-connect equipment connected the one port on the basis of the link connectivity verification ACK message;

the step of causing the photonic cross-connect equipment to cross-connect the transmission side and the reception side of the port of the photonic cross-connect equipment in response to the cross-connect instruction message;

the step of transmitting probe light on a data plane from the one port of the transmission equipment to the photonic cross-connect equipment and to receive probe light obtained by turning back the probe light from a cross-connect of the photonic cross-connect equipment; and the step of determining whether the probe light is attenuated higher than a preset threshold value in the transmission by comparing a value of power of the probe light transmitted from the transmission equipment and a value of power of the probe light obtained by turning back the probe light from a cross-connect of the photonic cross-connect equipment, wherein connectivity of a physical link connected to the one port between the photonic cross-connect equipment and the transmission equipment is verified based on a result in the step of determining.

2. A link connectivity verification method for an optical network including a node having a photonic cross-connect equipment and a transmission equipment, comprising:

the step of transmitting a link connectivity verification message on a control plane, wherein the link connectivity verification message includes an interface index of one port of the transmission equipment and a cross-connect instruction to cross-connect a port of the photonic cross-connect equipment connected to a port of the interface index from the transmission equipment to the photonic cross-connect equipment;

the step of causing the photonic cross-connect equipment to cross-connect a transmission side and a reception side of the photonic cross-connect equipment connected to a port of the interface index of the transmission equipment by a link in response to the cross-connect instruction included in the link connectivity verification message;

the step of transmitting probe light from the port of the interface index of the transmission equipment to the photonic cross-connect equipment and receiving probe light obtained by turning back the probe light from a cross-connect of the photonic cross-connect equipment; and the step of determining whether the probe light is attenuated higher than a preset threshold value in the transmission by comparing a value of power of the probe light transmitted from the transmission equipment and a value of power of the probe light obtained by tuning back the probe light from a cross-connect of the photonic cross-connect equipment, wherein connectivity of a physical link connected to the one port between the photonic cross-connect equipment and the transmission equipment is verified based on a result in the step of determining.

3. The link connectivity verification method according to claim 1, further comprising:

the step of monitoring and comparing a power of probe light transmitted and received by the transmission equipment, a power of probe light received by the photonic cross-connect equipment, and a power of probe light turned back and transmitted by the photonic cross-connect equipment, wherein a fault in a direction from the transmission equipment to the photonic cross-connect equipment or a fault in a direction from the photonic cross-connect equipment to the transmission equipment can be distinguished from each other.

4. The link connectivity verification method according to claim 2, further comprising:

the step of monitoring and comparing a power of probe light transmitted and received by the transmission equipment, a power of probe light received by the photonic cross-connect equipment, and a power of probe light turned back and transmitted by the photonic cross-connect equipment, wherein a fault in a direction from the transmission equipment to the photonic cross-connect equipment or a fault in a direction from the photonic cross-connect equipment to the transmission equipment can be distinguished from each other.

5. The link connectivity verification method according to any one of claims 1 through 4, wherein, when the steps are sequentially executed by using a plurality of links between the photonic cross-connect equipment and the transmission equipment as objects to be applied, connectivity of a plurality of links is verified.

* * * * *